US011749935B2

(12) United States Patent
Huang et al.

(10) Patent No.: US 11,749,935 B2
(45) Date of Patent: Sep. 5, 2023

(54) ELECTRICAL CONNECTOR

(71) Applicant: LUXSHARE TECHNOLOGIES INTERNATIONAL, INC., Milpitas, CA (US)

(72) Inventors: Bin Huang, Dongguan (CN); RongZhe Guo, Dongguan (CN); TieSheng Li, Dongguan (CN); HongJi Chen, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 253 days.

(21) Appl. No.: 17/395,978

(22) Filed: Aug. 6, 2021

(65) Prior Publication Data
US 2022/0102906 A1 Mar. 31, 2022

(30) Foreign Application Priority Data
Sep. 30, 2020 (CN) ......................... 202011057261.9

(51) Int. Cl.
*H01R 13/00* (2006.01)
*H01R 13/518* (2006.01)
*G02B 6/36* (2006.01)
*H01R 13/717* (2006.01)

(52) U.S. Cl.
CPC ......... *H01R 13/518* (2013.01); *G02B 6/3628* (2013.01); *H01R 13/7172* (2013.01)

(58) Field of Classification Search
CPC .. H01R 13/516; H01R 13/518; H01R 13/717; H01R 13/7172; H01R 13/7175; H01R 13/7177; G02B 6/24; G02B 6/36; G02B 6/3628; G02B 6/3632; G02B 6/3644

USPC ................................. 439/487, 489, 490
See application file for complete search history.

(56) References Cited

U.S. PATENT DOCUMENTS 11,205,873 B2 * 12/2021 Liu ....................... H01R 13/508
11,249,264 B2 *  2/2022 Edwards, Jr. ........ G02B 6/4268
2019/0115684 A1  4/2019 Khazen et al.

FOREIGN PATENT DOCUMENTS

| CN | 206236892 U | 6/2017 |
| TW | M585438 U   | 10/2019 |
| TW | M597523 U   | 6/2020 |

* cited by examiner

*Primary Examiner* — Khiem M Nguyen
(74) *Attorney, Agent, or Firm* — BIRCH, STEWART, KOLASCH & BIRCH, LLP

(57) ABSTRACT

An electrical connector, comprising a connector main body, a cable, a connecting housing, a limiting member, and a housing. The connector main body comprises a plugging side and a connecting side. One end of the cable is electrically connected with the connector main body, while the other end protrudes from the connecting side of the connector main body. The connecting housing is disposed at one side of the connector main body. The cable protrudes from one side of the connecting housing close to the connecting side. The limiting member is disposed at one side of the connecting housing close to the plugging side. The housing is disposed at one side of the connecting housing close to the plugging side. The plugging side of the connector main body is disposed in the housing. The connecting housing is assembled to the housing through the cooperation of the limiting member and the housing.

20 Claims, 14 Drawing Sheets

ELECTRICAL CONNECTOR

CROSS-REFERENCE TO RELATED APPLICATION

This application claims the priority benefit of Chinese Patent Application Serial Number 202011057261.9, filed on Sep. 30, 2020, the full disclosure of which is incorporated herein by reference.

BACKGROUND

Technical Field

The present disclosure relates to the technical field of connector, particularly to an electrical connector.

Related Art

Conventional connectors are often come with a connector body and a housing, wherein the connector body is often secured in the housing directly. When securing the connector body onto the housing, the connector body is prone to be displaced relative to the housing, indicating that the connector body to be not properly secured at the predetermined position, presenting poor assembly accuracy of the connector.

SUMMARY

The embodiments of the present disclosure provide an electrical connector tended to solve the problem of the poor assembly accuracy of the connector resulted from directly securing the connector main body onto the housing having the connector main body prone to be unsecured on the predetermined position.

The present disclosure provides an electrical connector, comprising a connector main body, a cable, a connecting housing, a limiting member, and a housing. The connector main body comprises a plugging side and a connecting side. One end of the cable is electrically connected with the connector main body, while the other end protrudes from the connecting side of the connector main body. The connecting housing is disposed at one side of the connector main body. The cable protrudes from one side of the connecting housing close to the connecting side. The limiting member is disposed at one side of the connecting housing close to the plugging side. The housing is disposed at one side of the connecting housing close to the plugging side. The plugging side of the connector main body is disposed in the housing. The connecting housing is assembled to the housing through the cooperation of the limiting member and the housing.

In the embodiments of the present disclosure, by providing the connecting housing on the connector main body and providing the limiting member on the connecting housing, the connector main body can be assembled onto the housing through connecting housing. The connector main body can be further positioned on the housing for enhancing overall assembly accuracy through the cooperation of the limiting member and the housing.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
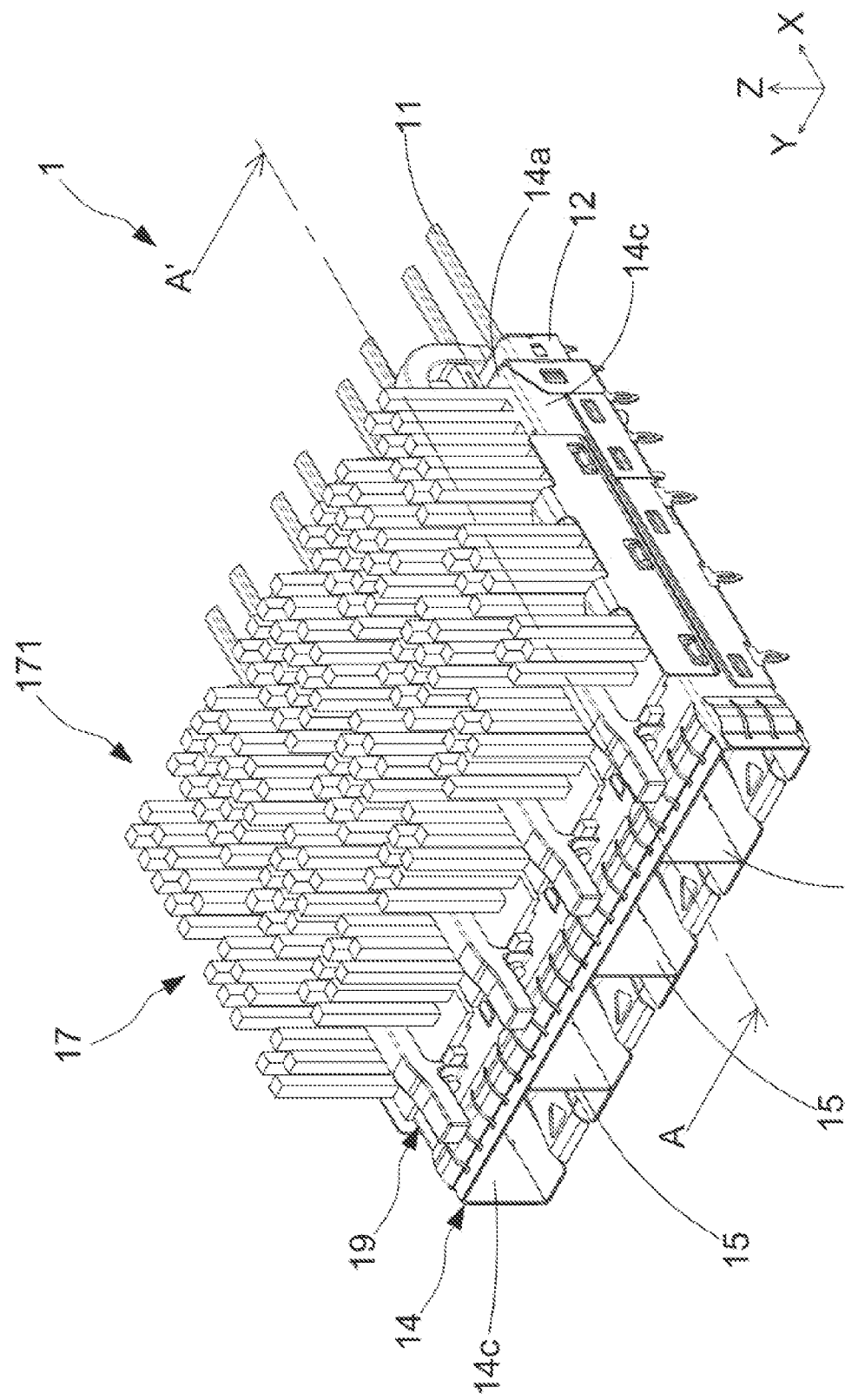
FIG. 1 is a perspective view of an electrical connector of the first embodiment of the present disclosure.
Figure 2:
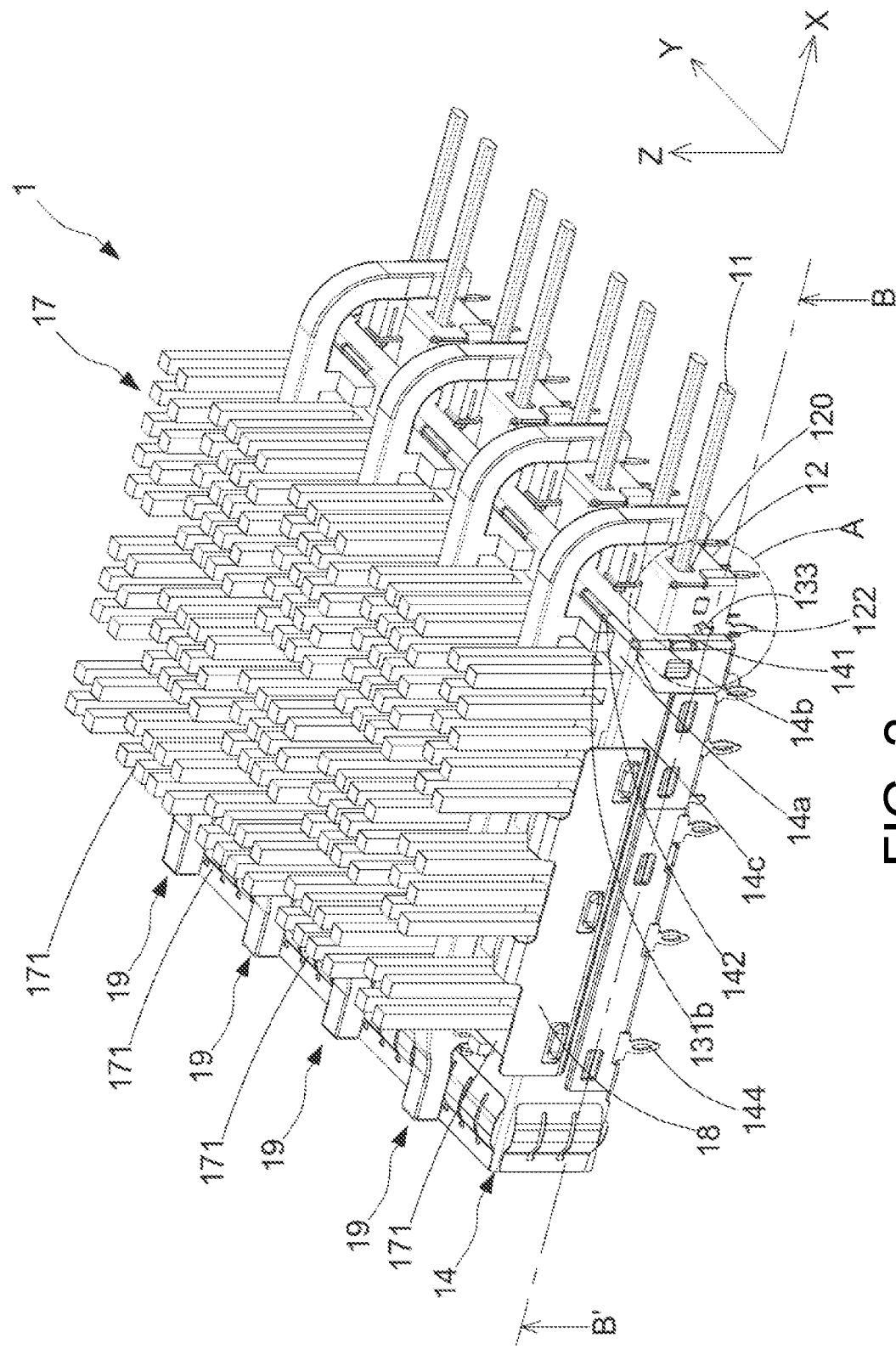
FIG. 2 is another perspective view of the electrical connector of the first embodiment of the present disclosure.
Figure 3:
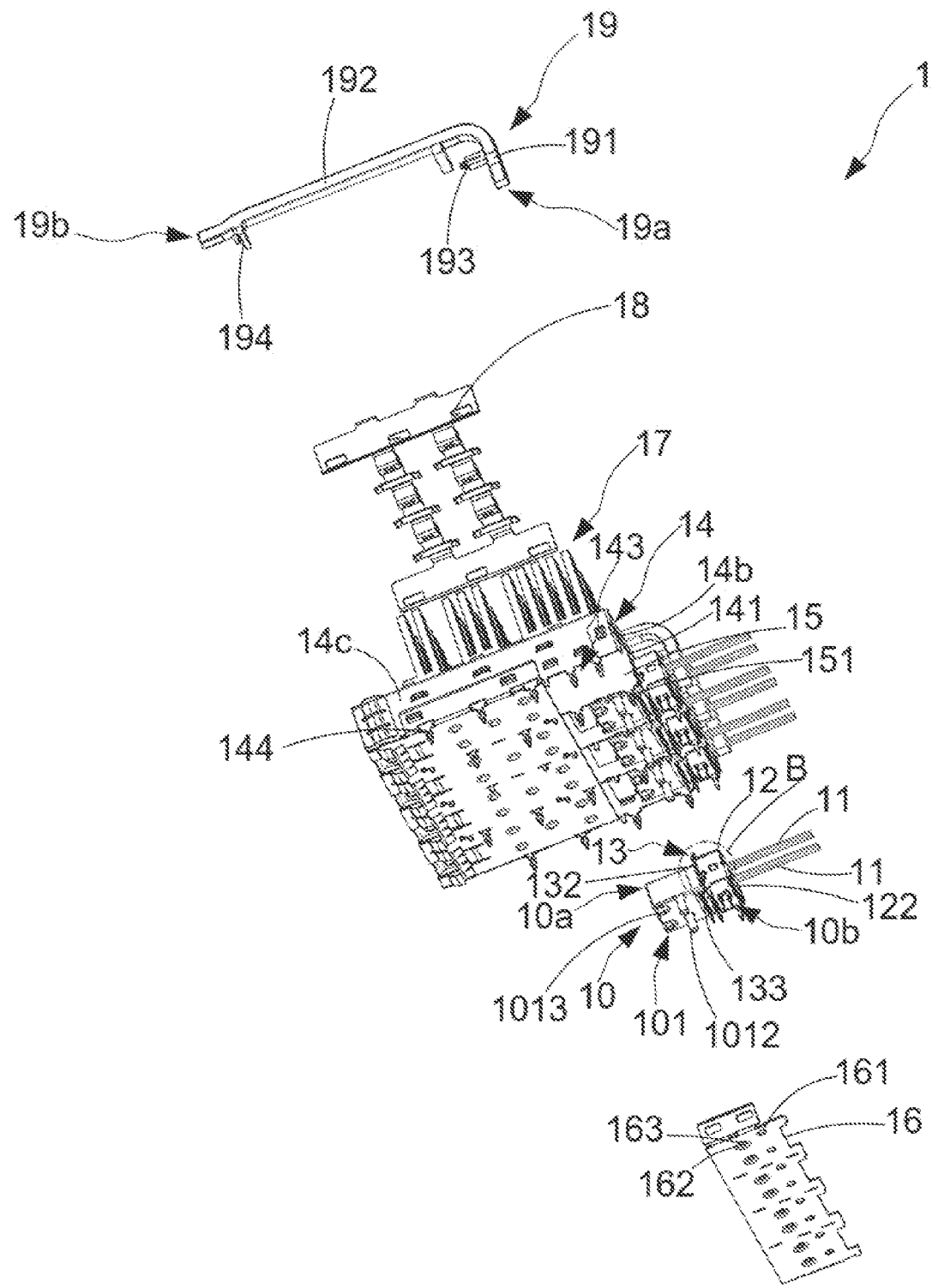
FIG. 3 is a partially exploded view of the electrical connector of the first embodiment of the present disclosure.
Figure 4:
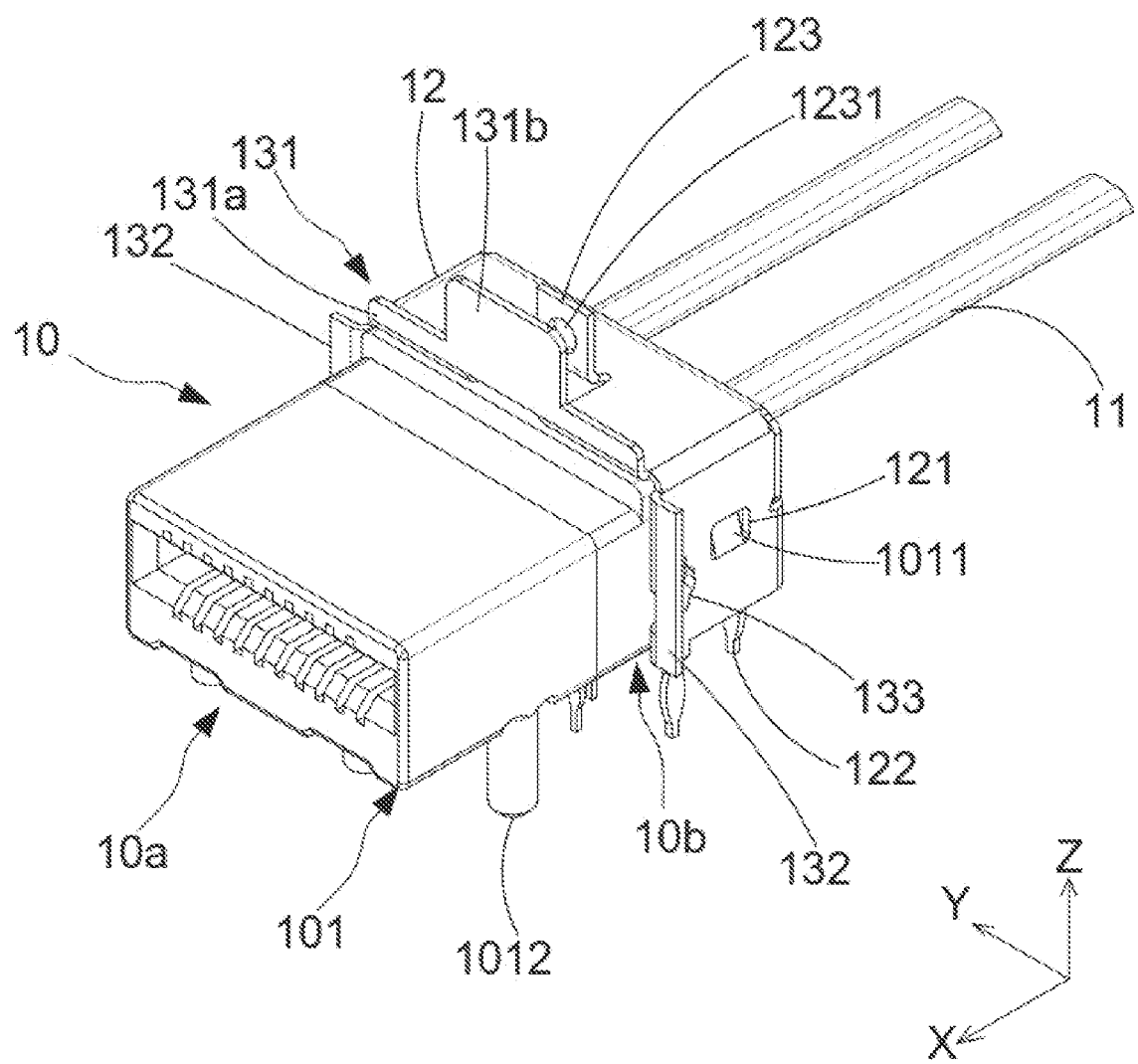
FIG. 4 is an assembly perspective view of the connector main body, cable, and connecting housing of the first embodiment of the present disclosure.
Figure 5:
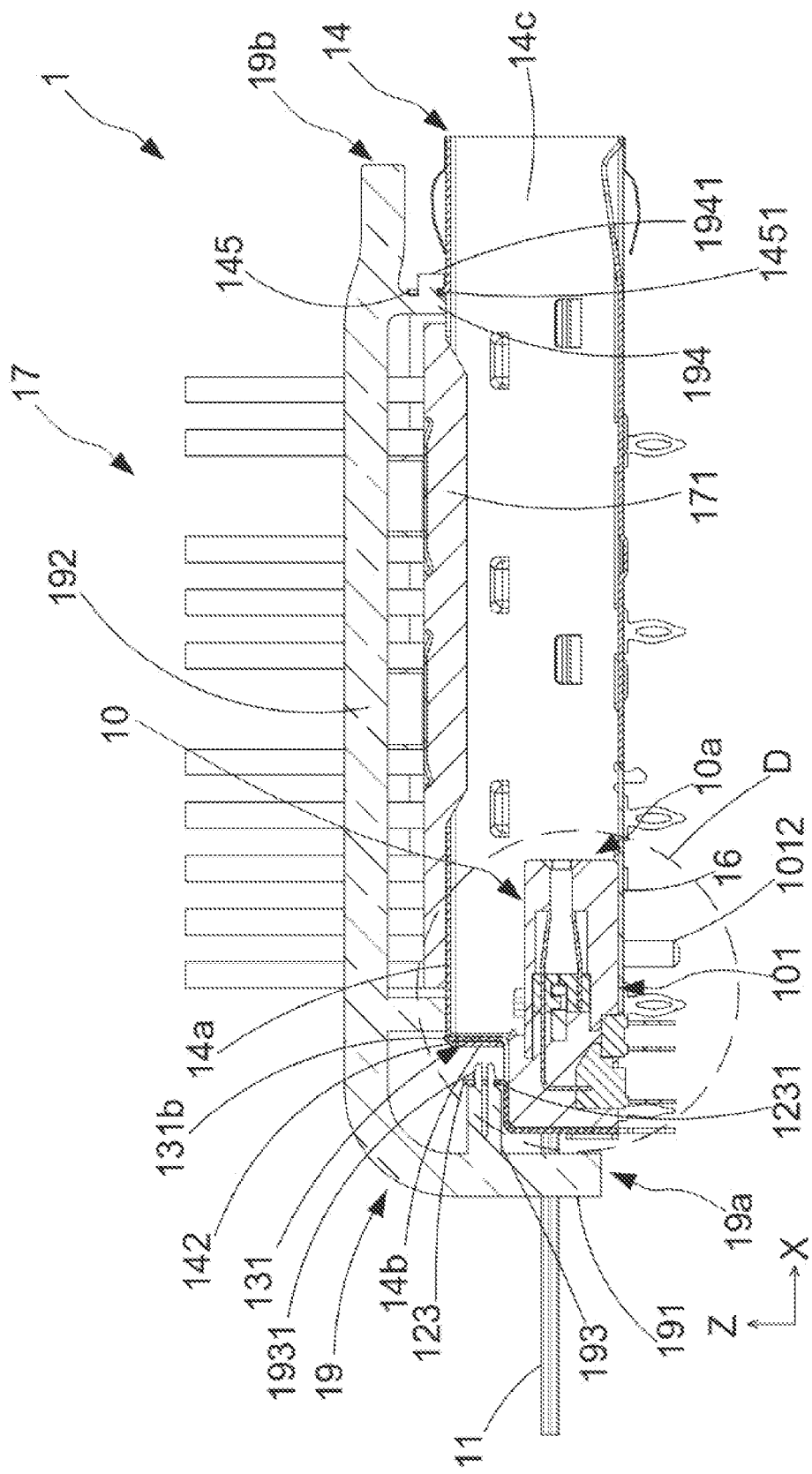
FIG. 5 is a cross-sectional view along line A-A' in FIG. 1.
Figure 6:
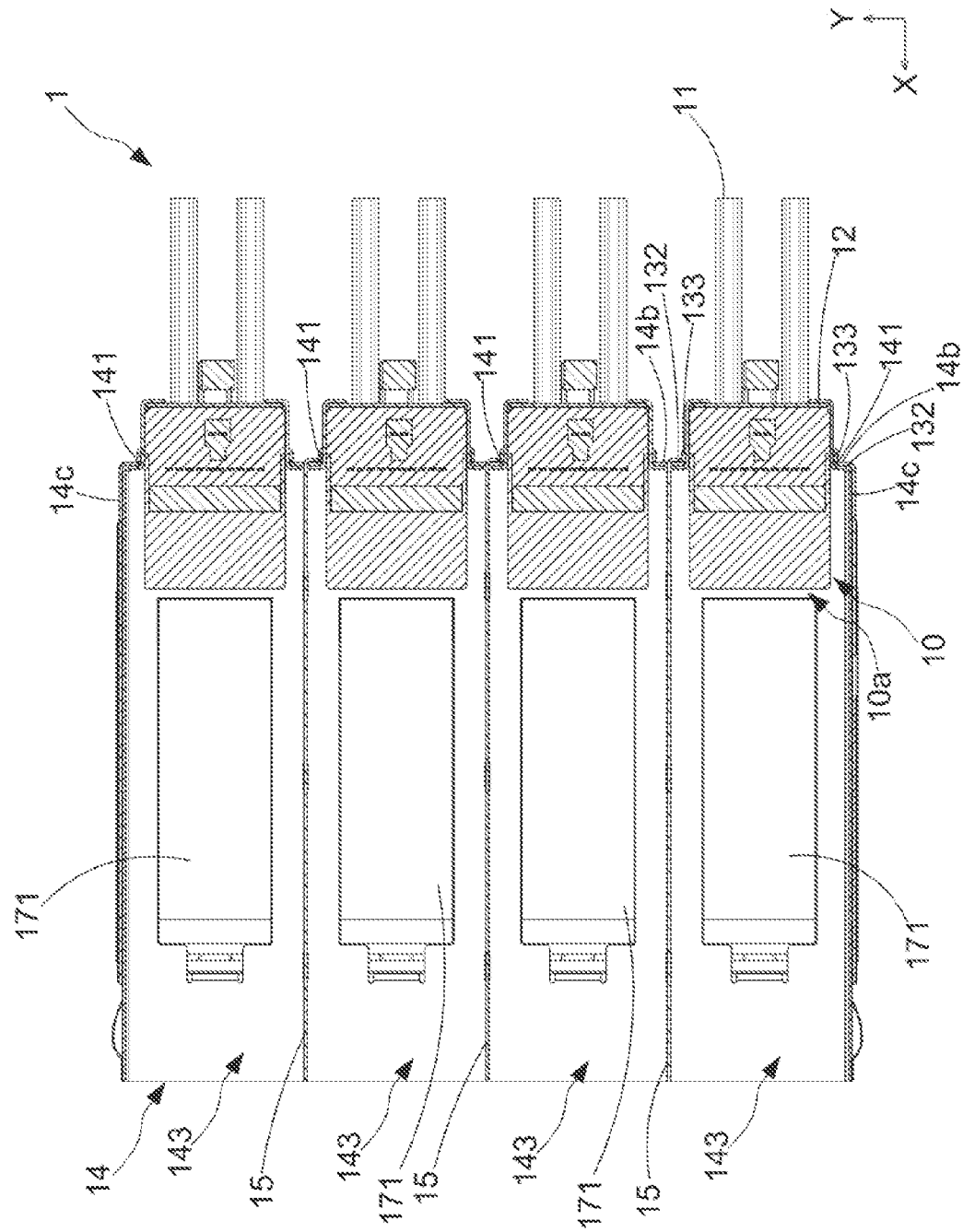
FIG. 6 is a cross-sectional view along line B-B' in FIG. 2.

FIG. 1 and FIG. 2 are perspective views of an electrical connector of the first embodiment of the present disclosure. FIG. 3 is a partially exploded view of the electrical connector of the first embodiment of the present disclosure. FIG. 4 is an assembly perspective view of the connector main body, cable, and connecting housing of the first embodiment of the present disclosure. FIG. 5 is a cross-sectional view along line A-A' in FIG. 1. FIG. 6 is a cross-sectional view along line B-B' in FIG. 2. As shown in the figures, the electrical connector 1 of this embodiment is an I/O connector, which is connected to a chip connector through a cable to perform high-speed transmission. In this embodiment, the electrical connector 1 comprises a connector main body 10, a cable 11, a connecting housing 12, a limiting member 13, and a housing 14. The connector main body 10 comprises a plugging side 10a and a connecting side 10b oppositely disposed. The connector main body 10 comprises a plurality of terminals. One end of the cable 11 is connected to at least one of the plurality of terminals and passes through the connecting side 10b of the connector main body 10. The connecting housing 12 is disposed at the connecting side 10b of the connector main body 10. The cable 11 passes through one side of the connecting housing 12 close to the connecting side 10b. That is, a surface of the connecting housing 12 close to the connecting side 10b comprises a wiring hole 120, and the cable 11 passes through the wiring hole 120 to protrude from one side of the connecting housing 12 close to the connecting side 10b. The limiting member 13 is disposed at one side of the connecting housing 12 close to the plugging side 10a. The housing 14 is disposed on one side of the connecting housing 12 close to the plugging side 10a. The connecting housing 12 is disposed on a sidewall of the housing 14 in a first direction X and protrudes from the sidewall of the housing 14 in the first direction X in a direction away from the housing 14. The plugging side 10a of the connector main body 10 is disposed in the housing 14, and the limiting member 13 corresponds to the sidewall of the housing 14 in the first direction X to prevent the connecting housing 12 from being detached from the housing 14 along the first direction X. Specifically, the housing 14 comprises a first sidewall 14a, a second sidewall 14b and two third sidewalls 14c. The second sidewall 14b is disposed on a side edge of the first sidewall 14a in the first direction X, the two third sidewalls 14c are respectively disposed on two side edges of the first sidewall 14a in a second direction Y, and the second sidewall 14b and the two third sidewalls 14c extend along a third direction Z. The second sidewall 14b is connected with the two third sidewalls 14c, the second sidewall 14b is disposed between the two third sidewalls 14c, and the second sidewall 14b is a sidewall of the housing 14 in the first direction X. That is, the connecting housing 12 is disposed on the second sidewall 14b and protrudes from the second sidewall 14b in a direction away from the housing 14. The second sidewall 14b comprises an assembly notch 141. The assembly notch 141 extends from one side of the second sidewall 14b away from the first sidewall 14a toward one side of the second sidewall 14b connected with the first sidewall 14a. The connecting housing 12 is disposed in the assembly notch 141. The limiting member 13 corresponds to the second sidewall 14b. In this way, the displacement of the connecting housing 12 in the first direction X can be restricted.

The limiting member 13 is disposed on one side of the connecting housing 12 close to the assembly notch 141 to correspond to the second sidewall 14b of the housing 14. Specifically, the limiting member 13 comprises a first limiting piece 131, two second limiting pieces 132, and a limiting bump 133 for description hereinafter. The first limiting piece 131 is disposed on one side of the connecting housing 12 close to a surface of the first sidewall 14a, and extends toward the first sidewall 14a along the third direction Z. In this embodiment, the first limiting piece 131 is disposed on a side edge of a surface of the connecting housing 12 close to the first sidewall 14a. The two second limiting pieces 132 are respectively disposed on one side of a surface of the connecting housing 12 close to the corresponding third sidewall 14c and extend toward the corresponding third sidewall 14c along the second direction Y. In this embodiment, the two second limiting pieces 132 are respectively disposed on side edges of a surface of the connecting housing 12 close to the corresponding third sidewall 14c. The two limiting bumps 133 are respectively disposed on one side of a surface of the connecting housing 12 close to the corresponding third sidewall 14c and protrude toward the corresponding third sidewall 14c along the second direction Y. Each of the limiting bumps 133 is opposite to the corresponding second limiting piece 132. When the connecting housing 12 is disposed in the assembly notch 141, the first limiting piece 131 and the two second limiting pieces 132 would be disposed in the housing 14, and the first limiting piece 131 and the two second limiting pieces 132 would respectively correspond to an inner surface of the second sidewall 14 to limit the connecting housing 12 from moving toward an outer surface of the second sidewall 14b of the housing 14 along the first direction X. The two limiting bumps 133 are disposed at the outside of the housing 14 and respectively correspond to an outer surface of the second sidewall 14b to limit the connecting housing 12 from moving toward an inner surface of the second sidewall 14b of the housing 14 along the first direction X.

Figure 7:
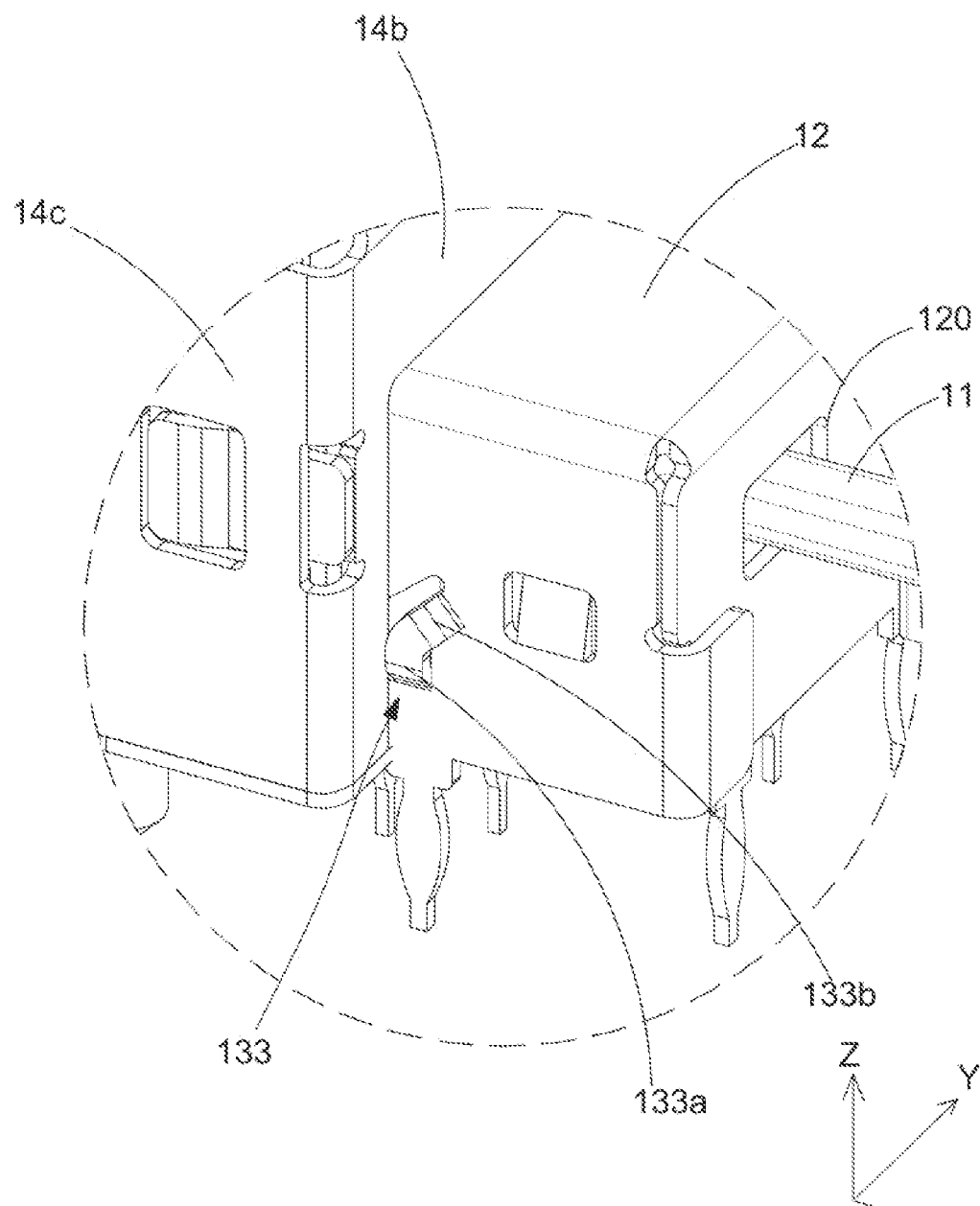
FIG. 7 is an enlarged view of area A of FIG. 2.
Figure 8:
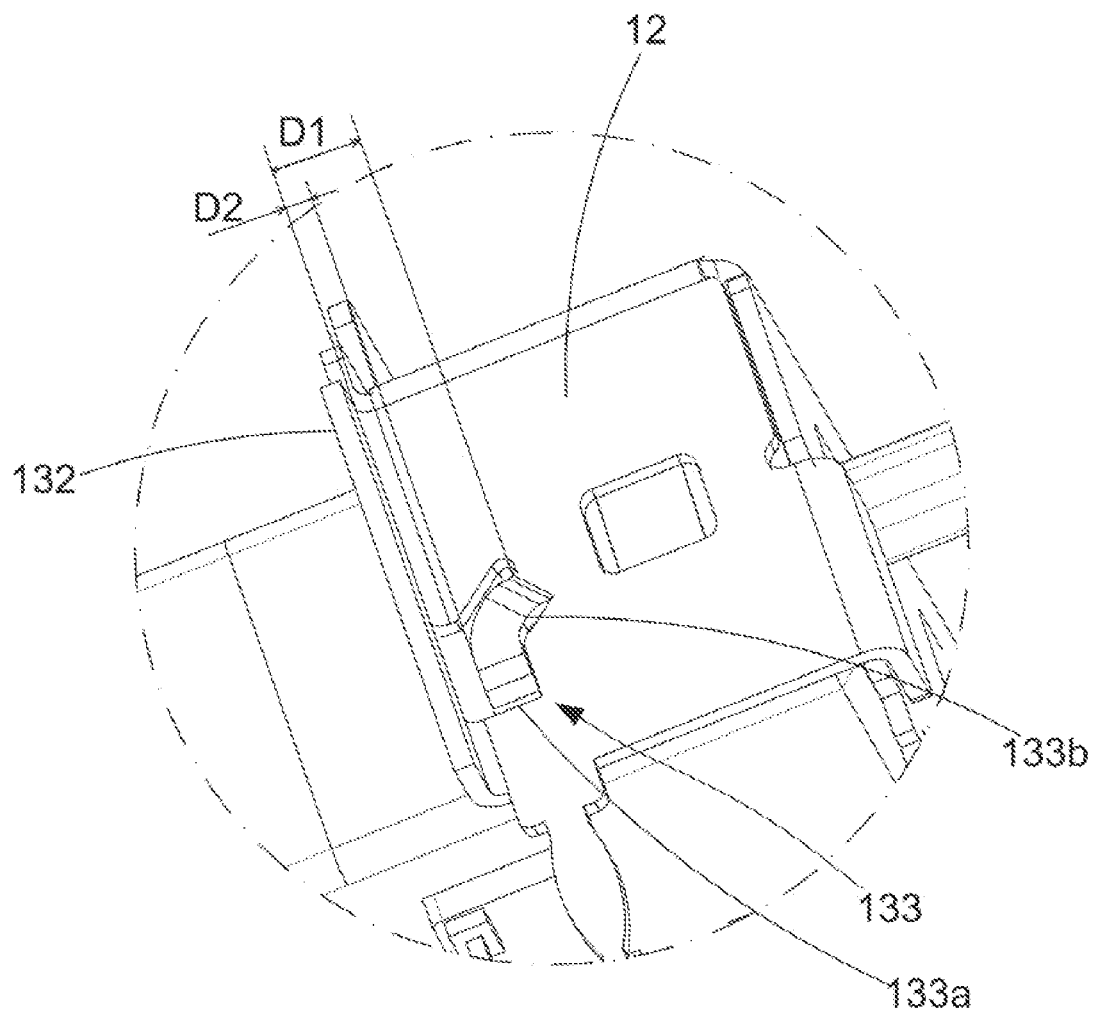
FIG. 8 is an enlarged view of area B of FIG. 3.

FIG. 7 is an enlarged view of area A of FIG. 2. FIG. 8 is an enlarged view of area B of FIG. 3. As shown in the figures, the limiting bump 133 of this embodiment comprises a limiting end part 133a and a guiding end part 133b. The limiting end part 133a is parallel to a side edge of a surface of the connecting housing 12 close to the corresponding third sidewall 14c, that is, parallel to the third direction Z. The guiding end part 133b is inclined to a side edge of a surface of the connecting housing 12 close to the corresponding third sidewall 14c, that is, inclined to the third direction Z. The minimum distance D1 between one end of the guiding end part 133b away from the limiting end part 133a and the corresponding second limiting piece 132 (a side edge of the connecting housing 12 close to the third sidewall 14c) is greater than the minimum distance D2 between one end of the guiding end part 133b close to the limiting end part 133a and the corresponding second limiting piece 132 (a side edge of the connecting housing 12 close to the third sidewall 14c). When the connecting housing 12 is disposed in the assembly notch 141, the second sidewall 14b of the housing 14 would firstly pass through the guiding end part 133b and then enter the limiting end part 133a. As the guiding end part 133b guides the second sidewall 14b of the housing 14 to enter the gap between the second limiting piece 132 and the limiting end part 133a, the guiding end part 133b is closer than the limiting end part 133a to the first sidewall 14a. Meanwhile, the minimum distance D2 between the limiting end part 133a and the corresponding second limiting piece 132 (a side edge of the connecting housing 12 close to the third sidewall 14c) is slightly greater than or equal to the thickness of the second sidewall 14b (as shown in FIG. 6). Thus, the connecting housing 12 can be limited on the housing 14. In this embodiment, the limiting member 13 is integrated with the connecting housing 12, the first limiting piece 131 and the two second limiting pieces 132 are manufactured by stamping and bending, and the two limiting bumps 133 are manufactured by stamping. The limiting bump 133 of this embodiment is hollowed.

Referring to FIG. 2, FIG. 4, and FIG. 5 again, in this embodiment, the first limiting piece 131 comprises a limiting part 131a and a positioning part 131b. The limiting part 131a is closer than the positioning part 131b to the connecting housing 12. The first sidewall 14a of the housing 14 comprises a positioning hole 142. When the connecting housing 12 is disposed in the assembly notch 141, the positioning part 131b would be disposed in the positioning hole 142 to position the connecting housing 12 in the housing 14. The limiting part 131a corresponds to an inner surface of the second sidewall 14b to restrict the connecting housing 12 from moving toward an outer surface of the second sidewall 14b along the first direction X. In this embodiment, the width of the positioning part 131b in the second direction Y is narrower than the width of the limiting part 131a in the second direction Y.

In other embodiments, a plurality of first limiting pieces 131 could be disposed on a side edge of the connecting housing 12 close to the first sidewall 14a, and a plurality of second limiting pieces 132 could be disposed on a side edge of the connecting housing 12 close to the corresponding third sidewall 14c for the same limiting effect as described above.

In other embodiments, the limiting member 13 can only comprise at least one of the first limiting piece 131, the second limiting piece 132, and the limiting bump 133. For example, the limiting member 13 comprises one first limiting piece 131, two second limiting pieces 132, or two limiting bumps 133, or the limiting member 13 comprises one first limiting piece 131 and two second limiting pieces 132, two second limiting pieces 132 and two limiting bumps 133, or one first limiting piece 131 and two limiting bumps 133.

Referring to FIG. 4 again, the connector main body 10 further comprises an insulating body 101 in which a plurality of terminals are disposed. In one embodiment, two opposite sides of the insulating body 101 in the second direction Y are respectively provided with a first positioning part 1011. Two opposite sides of the connecting housing 12 are respectively provided with a second positioning part 121. When the connecting housing 12 is disposed on the connector main body 10, each of the second positioning parts 121 would be connected with the corresponding first positioning part 1011 to secure the connecting housing 12 onto the connector main body 10. In this embodiment, the first positioning part 1011 is a column, and the second positioning part 121 is a hole.

Referring to FIG. 1, FIG. 3, and FIG. 6 again, the electrical connector 1 further comprises a plurality of partition plates 15 which are disposed in the housing 14 at intervals. Specifically, the plurality of partition plates 15 are disposed on an inner surface of the first sidewall 14a of the housing 14 at intervals, and one end of each of the partition plates 15 is connected with the second sidewall 14b of the housing 14. The plurality of partition plates 15 divide the space in the housing 14 into a plurality of accommodating space 143. In this embodiment, the number of assembly notches 141 is multiple. The plurality of assembly notches 141 respectively correspond to the plurality of accommodating spaces 143. The number of connector main bodies 10, the number of cables 11, and the number of connecting housings 12 are multiple. Each of the cables 11 is connected with the corresponding connector main body 10 respectively, and each of the connecting housings 12 is respectively disposed at one side of the corresponding connector main body 10. Each of the connecting housings 12 is disposed in the corresponding assembly notch 141. The plugging side 10a of each of the connector main bodies 10 is disposed in the corresponding accommodating space 143.

Referring to FIG. 3, FIG. 4, and FIG. 5 again, in this embodiment, the electrical connector 1 further comprises a bottom plate 16. The bottom plate 16 is disposed at one side of the connector main body 10 away from the housing 14 and is connected with the housing 14. Specifically, the bottom plate 16 is disposed at one side of the insulating body 101 away from the housing 14. In one embodiment, a surface of the insulating body 101 away from the housing 14 is provided with a plurality of positioning columns 1012, and the bottom plate 16 comprises a plurality of positioning holes 161. When the bottom plate 16 is disposed at one side of the insulating body 101 away from the housing 14, each of the positioning columns 1012 would pass through the corresponding positioning hole 161 to position the bottom plate 16 on the connector main body 10. In one embodiment, a surface of the insulating body 101 away from the housing 14 is provided with a plurality of securing columns 1013. The bottom plate 16 comprises a plurality of inner recesses 162 and a plurality of securing holes 163. The inner recess 162 is retracted in a direction toward the first sidewall 14a. The securing hole 163 is disposed in the inner recess 162. When the securing column 1013 passes through the corresponding securing hole 163, one end of the securing column 1013 at the outside of the bottom plate 16 would be heated and melted. The melted securing column 1013 would cover the inner recess 162 around the securing hole 163 so that the bottom plate 16 can be secured to the connector main body 10.

Referring to FIG. 2, FIG. 3, and FIG. 4 again, one side of the connecting housing 12 away from the first sidewall 14a of the housing 14 is provided with a plurality of plugging members 122 arranged at intervals, and one side of the second sidewall 14b and one side of the third sidewall 14c of the housing 14 away from the first sidewall 14a are respectively provided with a plurality of plugging members 144 arranged at intervals. One side of each of the partition plates 15 away from the first sidewall 14a of the housing 14 further comprises a plurality of plugging members 151 arranged at intervals. The plurality of plugging members 151 of each of the partition plates 15 pass through the bottom plate 16. When the electrical connector 1 is connected to an external circuit board, the plurality of plugging members 122 of the connecting housing 12, the plurality of plugging members 144 of the housing 14, and the plurality of plugging members 151 of each of the partition plates 15 would be directly plugged on the circuit board. The plurality of plugging members 122 of the connecting housing 12, the plurality of plugging members 144 of the housing 14, and the plurality of plugging members 151 of each of the partition plates 15 could comprise a fisheye component respectively so that the electrical connector 1 can be stably connected with the circuit board.

Referring to FIG. 2, FIG. 3, and FIG. 6 again, in this embodiment, the connector 1 further comprises a heat dissipating component 17, which is disposed on an outer surface of the first sidewall 14a of the housing 14. The heat dissipating component 17 comprises a plurality of radiators 171. The plurality of radiators 171 is disposed on an outer surface of the first sidewall 14a of the housing 14 at intervals along the second direction Y, and respectively corresponds to the plurality of accommodating spaces 143 to dissipate heat from the mating connector inserted in the corresponding accommodating space 143. Each of the radiators 171 could be a finned radiator or a cylindrical radiator, and the radiator 171 in this embodiment is cylindrical. In this embodiment, the electrical connector 1 further comprises a securing elastic piece 18. The securing elastic piece 18 is disposed at one side of the heat dissipating component 17 and is connected with the housing 14. The securing elastic piece 18 could press the plurality of radiators 171 to secure the radiators 171 on the housing 14.

Referring to FIG. 2, FIG. 4, and FIG. 5 again, in this embodiment, the electrical connector 1 further comprises a light guiding tube 19 comprising a light entering end 19a and a light exiting end 19b. The light entering end 19a of the light guiding tube 19 is disposed at one side of the connecting housing 12 away from the housing 14, and the light exiting end 19b of the light guiding tube 19 is disposed at one side of the housing 14. The light guiding tube 19 could guide the light emitted from the light emitting part of the circuit board. Specifically, the light guiding tube 19 comprises a first light guiding end part 191 and a second light guiding end part 192 that are mutually connected. The first light guiding end part 191 extends along the third direction Z, and the second light guiding end part 192 extends along the first direction X, thereby forming an L-shaped light guiding tube 19. The light entering end 19a is disposed at one end of the first light guiding end part 191 away from the second light guiding end part 192, and the light exiting end 19b is disposed at one end of the second light guiding end part 192 away from the first light guiding end part 191. The first light guiding end part 191 is disposed at one side of the connecting housing 12 away from the housing 14, and the second light guiding end part 192 is disposed at one side of the first sidewall 14a of the housing 14. The light guiding tube 19 further comprises a first positioning column 193 and a second positioning column 194. The first positioning column 193 is disposed at the first light guiding end part 191 and extends in a direction toward the light exiting end 19b along the first direction X. The second positioning column 194 is disposed at the second light guiding end part 192 and extends in a direction toward the light entering end 19a along the third direction Z. An outer surface of the connecting housing 12 in the third direction Z is provided with a first positioning tab 123 extending along the third direction Z. The outer surface of the first sidewall 14a of the housing 14 is further provided with a second positioning tab 145 extending along the third direction Z. When the connecting housing 12 is disposed on the housing 14, the first positioning tab 123 would be disposed at the outside of the housing 14, and a gap would exist between the first positioning tab 123 and the second sidewall 14b of the housing 14. When the light guiding tube 19 is disposed on the housing 14, the first positioning column 193 would be connected with the first positioning tab 123, and the second positioning column 194 would be connected with the second positioning tab 145 to secure the light guiding tube 19 onto the connecting housing 12 and the housing 14. In this embodiment, one end of the first positioning column 193 away from the first light guiding end part 191 is provided with a first buckling part 1931, and the first positioning tab 123 comprises a first positioning through hole 1231. When the first buckling part 1931 passes through the first positioning through hole 1231, the first buckling part 1931 would abut against a surface of the first positioning through hole 1231 close to the second sidewall 14b to secure the light guiding tube 19 on the connecting housing 12. Similarly, one end of the second positioning column 194 away from the second light guiding end part 192 is provided with a second buckling part 1941, and the second positioning tab 145 comprises a second positioning through hole 1451. When passing through the second positioning hole 1451, the second buckling part 1941 would abut against a surface of the second positioning hole 1451 away from the second sidewall 14b to secure the light guiding tube 19 on the housing 14. In this embodiment, the number of light guiding tubes 19 is multiple. The plurality of light guiding tubes 19 are disposed on the housing 14 at intervals and respectively correspond to the plurality of connecting housings 12.

Figure 9:
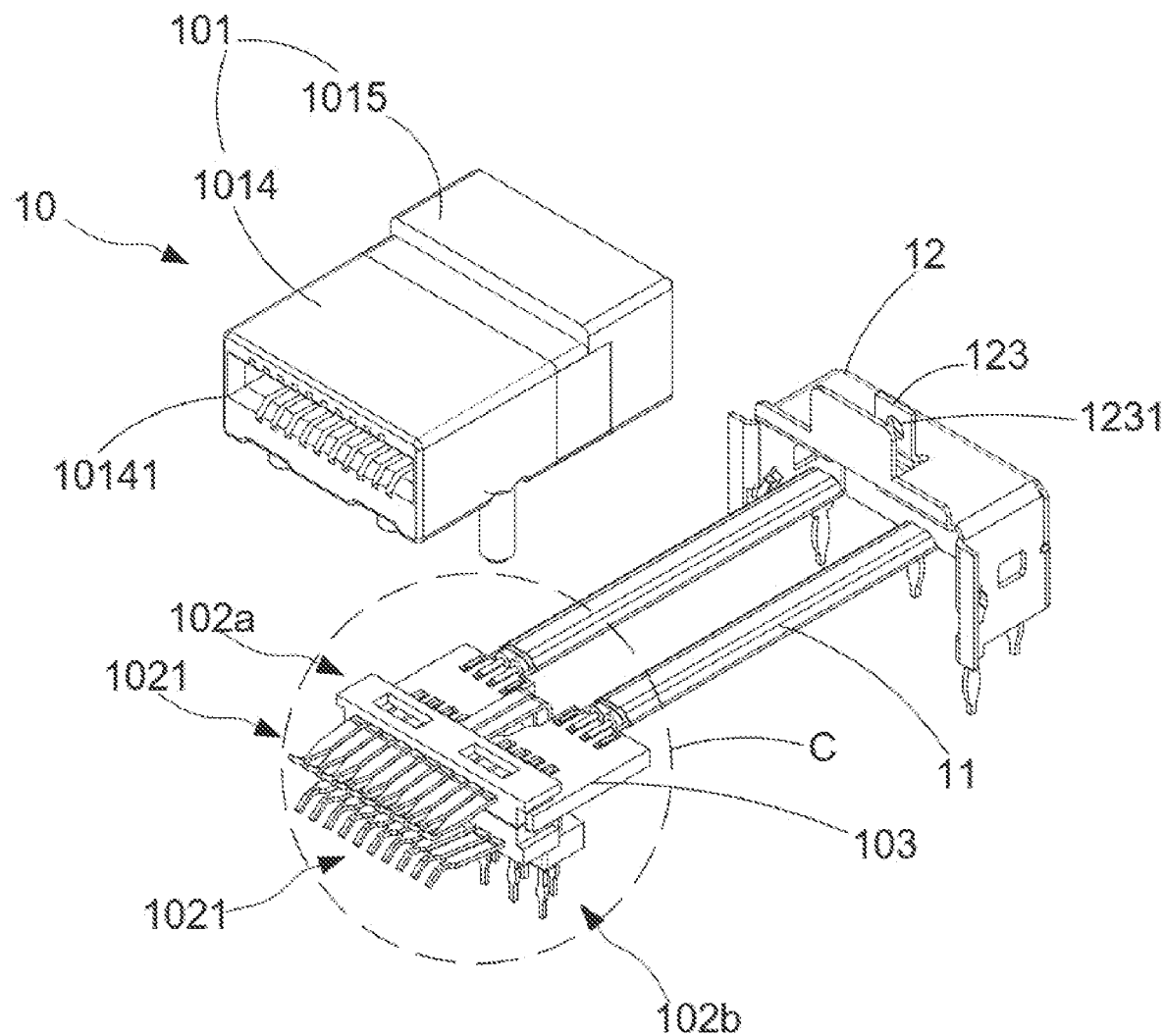
FIG. 9 is an exploded view of FIG. 4.
Figure 10:
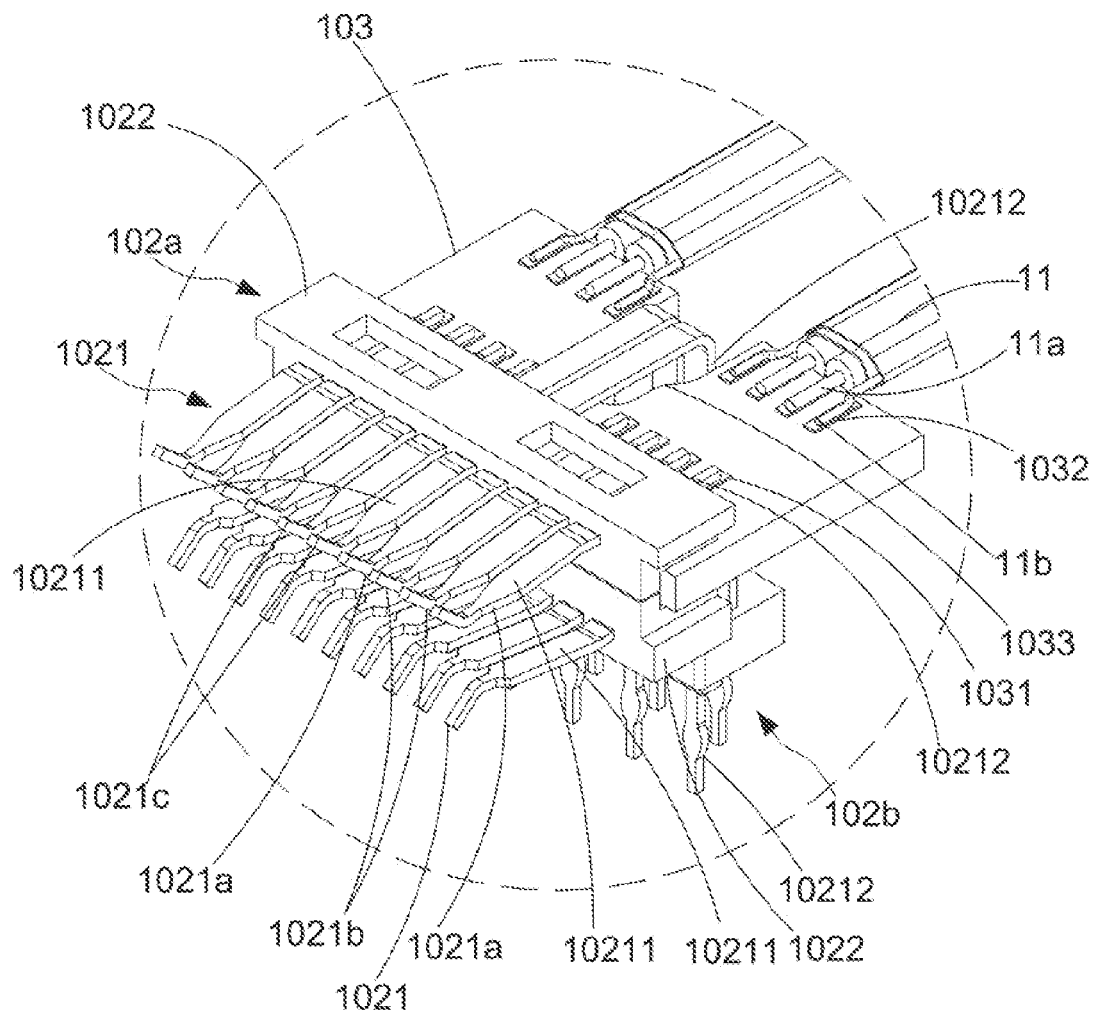
FIG. 10 is an enlarged view of area C of FIG. 9.

The following describes the configuration of the connector main body 10 of this embodiment in detail. FIG. 9 is an exploded view of FIG. 4. FIG. 10 is an enlarged view of area C of FIG. 9. As shown in the figures, the connector main body 10 comprises a first terminal component 102a and a second terminal component 102b, wherein the first terminal component 102a is disposed on one side of the second terminal component 102b. The first terminal component 102a and the second terminal component 102b respectively comprise a plurality of terminals 1021. In this embodiment, the connector main body 10 further comprises an adapting board 103, which is disposed between the first terminal component 102a and the second terminal component 102b. A surface of the adapting board 103 close to the first terminal component 102a comprises a plurality of terminal conductive pads 1031 and a plurality of cable conductive pads 1032. The plurality of terminal conductive pads 1031 are disposed in a row at one side of the adapting board 103 at intervals, and the plurality of cable conductive pads 1032 are disposed in a row at the other side of the adapting board 103 at intervals. Each of the terminal conductive pads 1031 is connected with the corresponding terminal 1021 of the first terminal component 102a. The number of cables 11 is multiple. Each of the cables 11 comprises at least one signal wire 11a and at least one ground wire 11b. Each of the signal wires 11a of each of the cables 11 is connected with the corresponding cable conductive pad 1032. Each of the ground wires 11b of each of the cables 11 is connected with the corresponding cable conductive pad 1032. The insulating body 101 is disposed at the first terminal component 102a, the second terminal component 102b, the adapting board 103, and the plurality of cables 11.

Figure 11:
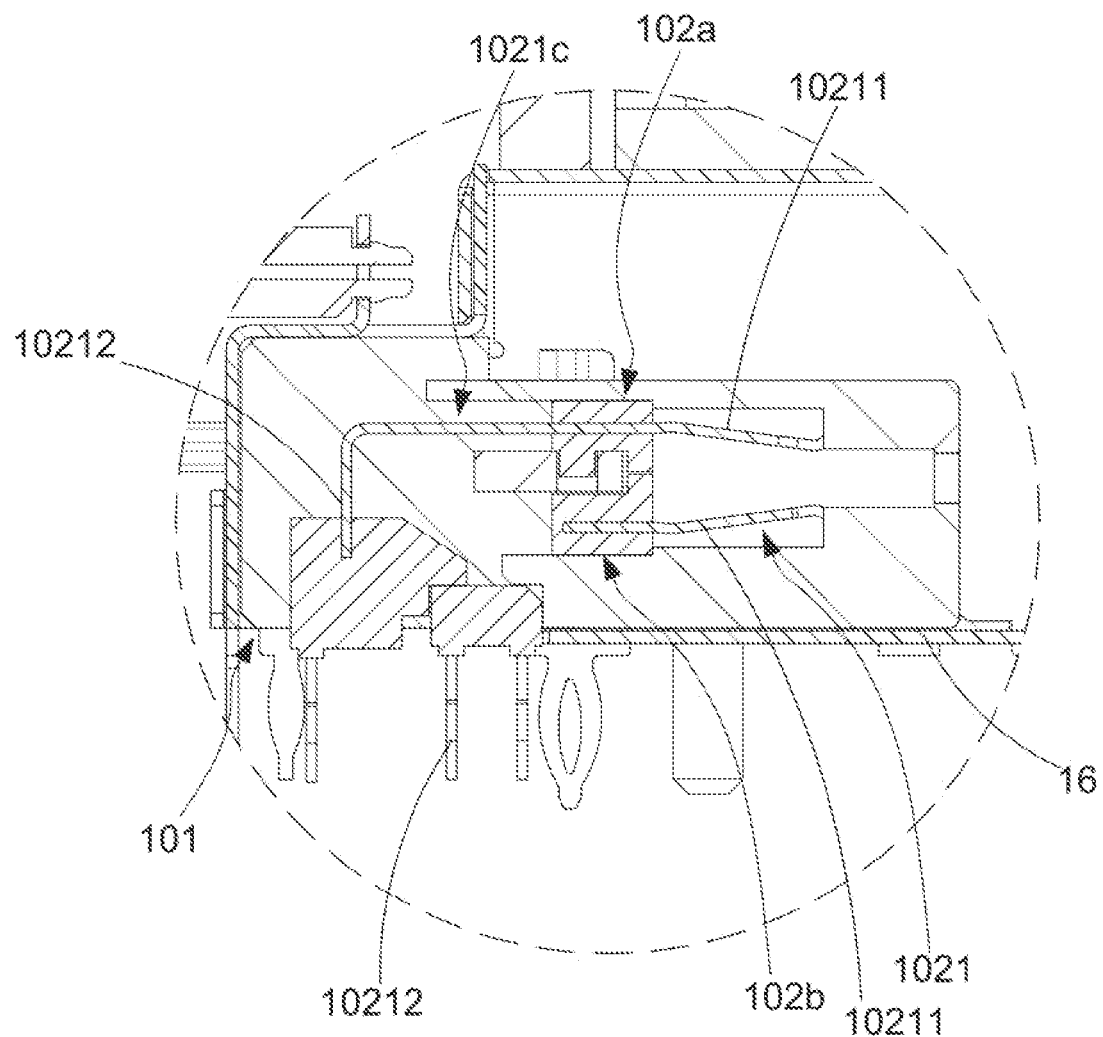
FIG. 11 is an enlarged view of area D of FIG. 5.

In this embodiment, the plurality of terminals 1021 of the first terminal component 102a comprises a plurality of ground terminals 1021a, a plurality of signal terminals 1021b, and a plurality of power terminals 1021c. In this embodiment, the number of the ground terminals 1021a is four, the number of the signal terminals 1021b is four, and the number of the power terminals 1021c is two. Two signal terminals 1021b are disposed between two adjacent ground terminals 1021a. Two power terminals 1021c are adjacently disposed. Two adjacent power terminals 1021c form a power terminal group. Two sides of the power terminal group are respectively provided with a ground terminal 1021a. That is, two adjacent power terminals 1021c (the power terminal group) are disposed between two adjacent ground terminals 1021a. It can be seen from FIG. 10 that the order of the plurality of terminals 1021 of the first terminal component 102a from right to left is ground terminal 1021a, two signal terminals 1021b, ground terminal 1021a, two power terminals 1021c, ground terminal 1021a, two signal terminals 1021b, and ground terminal 1021a. The plurality of ground terminals 1021a and the plurality of signal terminals 1021b are respectively connected with the corresponding terminal conductive pads 1031. FIG. 11 is an enlarged view of area D of FIG. 5. As shown in the figure, one ends of the two power terminals 1021c and one ends of the plurality of terminals 1021 of the second terminal component 102b protrude from one side of the insulating body 101 to connect with an external circuit board. In this embodiment, the plurality of signal terminals 1021b of the first terminal component 102a are high-speed terminals. The plurality of signal terminals 1021b of the first terminal component 102a are connected with the plurality of cables 11 through the adapting board 103 and are connected with the external chip connector through the plurality of cables 11 to perform high-speed transmission and to ensure the connection between the plurality of ground terminals 1021a and the plurality of cables 11 and between the plurality of signal terminals 1021b and the plurality of cables 11 are stable.

In this embodiment, each of the terminals 1021 comprises a contacting end part 10211 and a connecting end part 10212. The connecting end part 10212 of each of the ground terminals 1021a and the connecting end part 10212 of each of the signal terminals 1021b of the first terminal component 102a are respectively connected with the corresponding terminal conductive pad 1031. The width of the connecting end part 10212 of each of the ground terminals 1021a is narrower than the width of the contacting end part 10211 of each of the ground terminals 1021a and is narrower than the width of the terminal conductive pad 1031. In this way, the connecting end part 10212 of each of the ground terminals 1021a can be disposed in the terminal conductive pad 1031 to increase the contact area between the connecting end part 10212 of each of the ground terminals 1021a and the terminal conductive pad 1031 so that the connecting end part 10212 of each of the ground terminals 1021a can be stably connected with the corresponding terminal conductive pad 1031. Similarly, in this embodiment, the width of the connecting end part 10212 of each of the signal terminals 1021b is narrower than the width of the contacting end part 10211 of each of the signal terminals 1021b and is narrower than the width of the terminal conductive pad 1031. In this way, the connecting end part 10212 of each of the signal terminals 1021b can be disposed in the terminal conductive pad 1031 to increase the contact area between the connecting end part 10212 of each of the signal terminals 1021b and the terminal conductive pad 1031 so that the connecting end part 10212 of each of the signal terminals 1021b can be stably connected with the corresponding terminal conductive pad 1031. The wire diameter of each of the signal wires 11a of each of the cables 11 and the wire diameter of each of the ground wires 11b could also be smaller than the width of the cable conductive pad 1032. In this way, each of the signal wires 11a and each of the ground wires 11b can be respectively disposed in the cable conductive pad 1032 to increase the contact area between each of the signal wires 11a and the corresponding cable conductive pad 1032 and between each of the ground wires 11b and the corresponding cable conductive pad 1032, so that each of the signal wires 11a and each of the ground wires 11b can be stably connected with the corresponding cable conductive pad 1032. Besides, in this embodiment, the plurality of signal wires 11a of each of the cables 11 are not directly soldered to the plurality of signal terminals 1021b, and the plurality of ground wires 11b of each of the cables 11 are not directly soldered to the plurality of ground terminals 1021a. In this way, the wire diameter of each of the signal wires 11a of each of the cables 11 and the wire diameter of each of the ground wires 11b of each of the cables 11 would not be limited by the dimensions of the terminal 1021, so that the selectivity for the wire diameter of each of the signal wires 11a of each of the cables 11 and the wire diameter of each of the ground wires 11b of each of the cables 11 can be improved. Thus, the complexity of the soldering process and the overall soldering cost could also be reduced.

The connecting end part 10212 of each of the power terminals 1021c of the first terminal component 102a is orthogonal to the contacting end part 10211. The adapting board 103 comprises a gap 1033. The connecting end part 10212 of each of the power terminals 1021c passes through the gap 1033 and protrudes from one side of the insulating body 101. The extending direction of the connecting end part 10212 of each of the terminals 1021 of the second terminal component 102b is orthogonal to the extending direction of the contacting end part 10211. The connecting end part 10212 of each of the terminals 1021 protrudes from one side of the insulating body 101. In this embodiment, the connecting end part 10212 of each of the power terminals 1021c of the first terminal component 102a and the connecting end part 10212 of each of the terminals 1021 of the second terminal component 102b respectively comprise a fisheye component for being plugged on an external circuit board. The connecting end part 10212 of each of the power terminals 1021c of the first terminal component 102a and the connecting end part 10212 of each of the terminals 1021 of the second terminal component 102b can also be directly soldered to an external circuit board.

In this embodiment, the first terminal component 102a and the second terminal component 102b further comprise a terminal insulating body 1022, respectively. The terminal insulating body 1022 of the first terminal component 102a is disposed on the plurality of terminals 1021 of the first terminal component 102a, and the terminal insulating body 1022 of the second terminal component 102b is disposed on the plurality of terminals 1021 of the second terminal component 102b. Thus, the plurality of terminals 1021 are integrated through the terminal insulating body 1022 for further assembly.

In this embodiment, the insulating body 101 comprises an insulating housing 1014 and an insulating covering body 1015. The insulating housing 1014 comprises a plugging slot 10141 in which the contacting end part 10211 of each of the terminals 1021 is disposed. The insulating covering body 1015 is connected with the insulating housing 1014 and covers the plurality of terminal insulating bodies 1022, the connecting end part 10212 of each of the terminals 1021, the adapting board 103, and a part of the cable 11. The connecting housing 12 is disposed at the insulating covering body 1015, and the bottom plate 16 is disposed at the insulating housing 1014.

Figure 12:
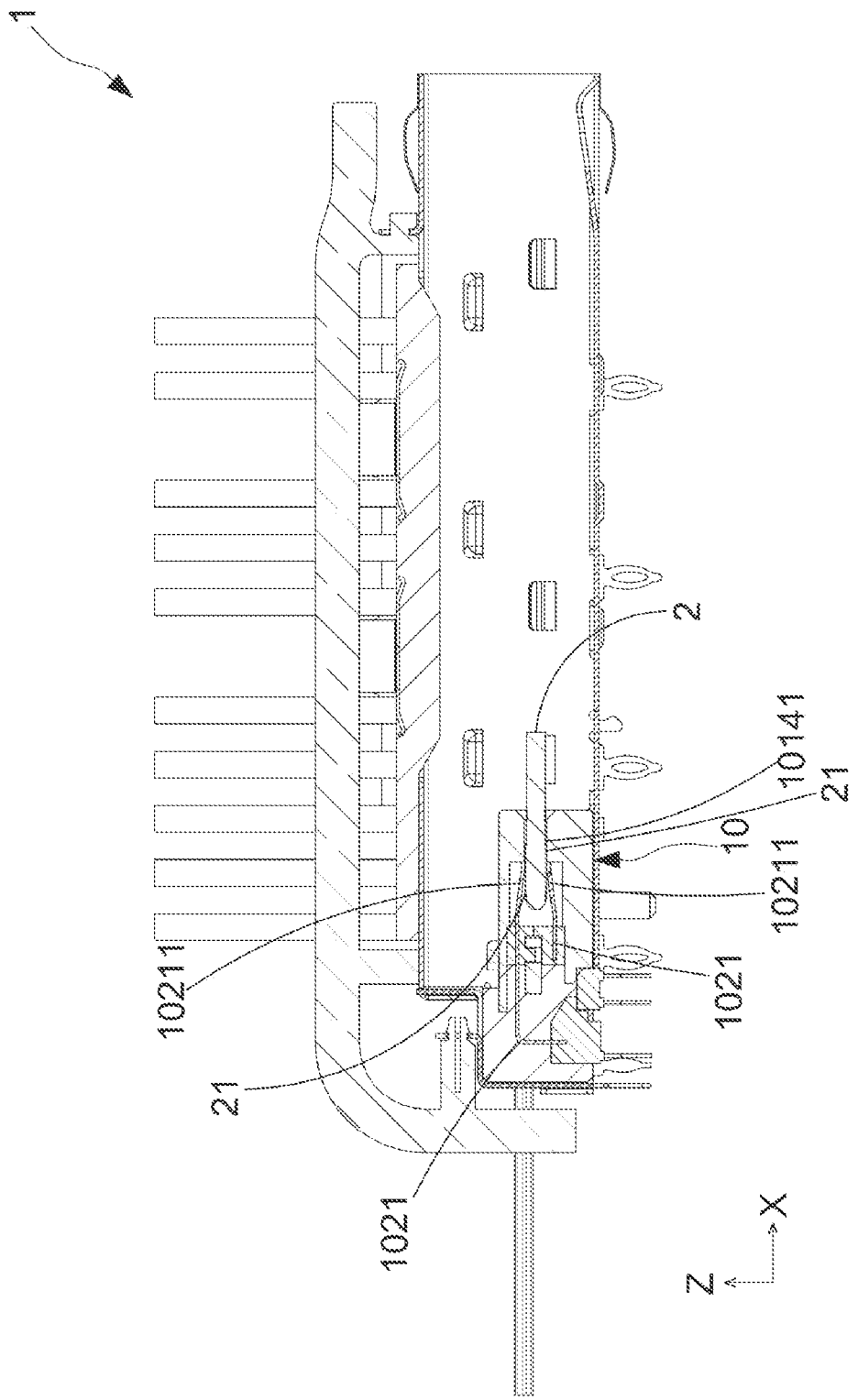
FIG. 12 is an use state diagram of the electrical connector of the first embodiment.

FIG. 12 is an use state diagram of the electrical connector of the first embodiment. As shown in the figure, when the electrical connector 1 of this embodiment is connected with the mating connector, the mating connector would comprise a plated member 2. Two opposite surfaces of the plated member 2 respectively comprise a plurality of contacting pads 21 disposed at intervals. The plated member 2 is inserted in the plugging slot 10141 of the connector main body 10, and the contacting end part 10211 of each of the terminals 1021 is connected with the corresponding contacting pad 21.

Figure 13:
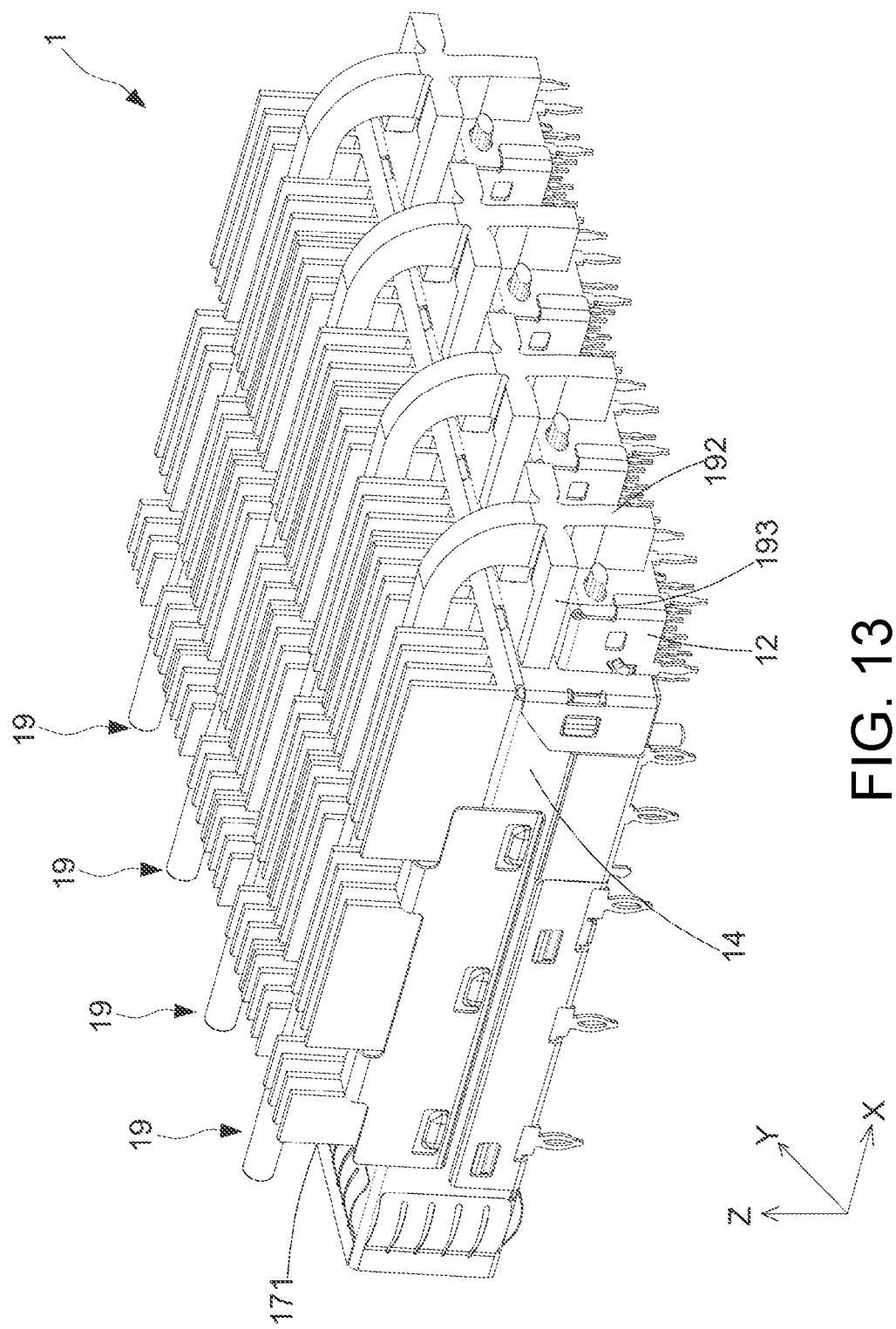
FIG. 13 is a perspective view of an electrical connector of the second embodiment of the present disclosure.
Figure 14:
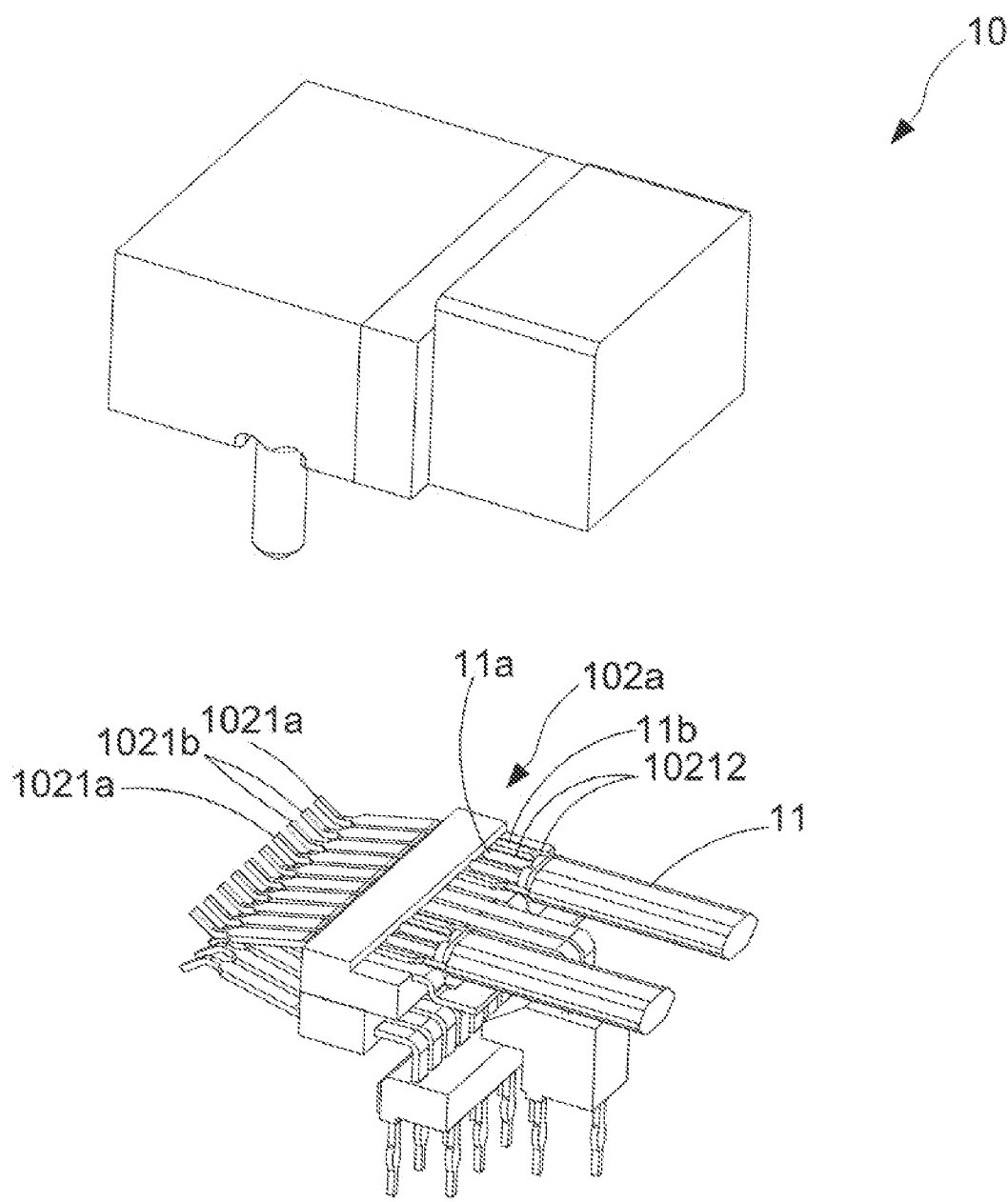
FIG. 14 is an exploded view of the connector main body of the second embodiment of the present disclosure.

FIG. 13 is a perspective view of an electrical connector of the second embodiment of the present disclosure. FIG. 14 is an exploded view of the connector main body of the second embodiment of the present disclosure. As shown in the figures, the electrical connector 1 of this embodiment is different from that of the first embodiment in that the connector main body 10 is not provided with an adapting board. Each of the signal wires 11a of each of the cables 11 is connected with the connecting end part 10212 of the corresponding signal terminal 1021b in the first terminal component 102a by soldering. Each of the ground wires 11b of each of the cables 11 is connected with the connecting end part 10212 of the corresponding ground terminal 1021a in the first terminal component 102a by soldering.

In summary, embodiments of the present disclosure provide an electrical connector. By providing the connecting housing on the connector main body and providing the limiting member on the connecting housing, the connector main body, the connecting housing, and the limiting member can be integrated. The connector main body can be assembled onto the housing through connecting housing. The connector main body can be further positioned on the housing for enhancing overall assembly accuracy through the cooperation of the limiting member and the housing. Meanwhile, a positioning column is provided on the connector main body. When the bottom plate is assembled to the connector main body, the positioning column would be disposed in the positioning hole of the bottom plate to perform positioning. Besides, a securing column is provided on the connector main body. When the bottom plate is assembled to the connector main body, the securing column would be disposed in the securing hole of the bottom plate, and the bottom plate can be secured on the connector main body by hot-melting.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An electrical connector, comprising:
    a connector main body comprising a plugging side and a connecting side;
    a cable, one end of the cable being electrically connected with the connector main body, the other end of the cable protruding from the connecting side of the connector main body;
    a connecting housing disposed at one side of the connector main body, the cable protruding from one side of the connecting housing close to the connecting side;
    a limiting member disposed at one side of the connecting housing close to the plugging side; and
    a housing disposed at one side of the connecting housing close to the plugging side, the plugging side of the connector main body being disposed in the housing, the connecting housing being assembled to the housing through the cooperation of the limiting member and the housing.

2. The electrical connector according to claim 1, wherein the connecting housing is disposed at a sidewall of the housing in a first direction; the connecting housing protrudes in a direction away from the housing from a sidewall of the housing in the first direction; the limiting member corresponds to the sidewall of the housing in the first direction.

3. The electrical connector according to claim 2, wherein the housing comprises a first sidewall, a second sidewall, and two third sidewalls; the second sidewall is disposed on a side edge of the first sidewall in the first direction; the two third sidewalls are respectively disposed on two side edges of the first sidewall in a second direction; the second sidewall is a sidewall of the housing in the first direction; the second sidewall comprises an assembly notch in which the connecting housing is disposed; the limiting member corresponds to the second sidewall.

4. The electrical connector according to claim 3, wherein limiting member comprises a first limiting piece; the first limiting piece is disposed at one side of a surface of the connecting housing close to the first sidewall and extends toward the first sidewall along a third direction; the first limiting piece corresponds to an inner surface of the second sidewall.

5. The electrical connector according to claim 4, wherein the first limiting piece comprises a limiting part and a positioning part; the positioning part is closer than the limiting part to the connecting housing; the first sidewall of the housing comprises a positioning hole in which the positioning part is disposed.

6. The electrical connector according to claim 5, wherein the width of the positioning part in the second direction is narrower than the width of the limiting part in the second direction.

7. The electrical connector according to claim 4, wherein the limiting member comprises a second limiting piece; the second limiting piece is disposed at one side of a surface of the connecting housing close to the corresponding third sidewall and extends toward the corresponding third sidewall along the second direction; the second limiting piece is disposed in the housing and corresponds to an inner surface of the second sidewall.

8. The electrical connector according to claim 7, wherein the limiting member comprises a limiting bump; the limiting bump is disposed at one side of the surface of the connecting housing close to the corresponding third sidewall and protrudes toward the corresponding third sidewall along the second direction; the limiting bump is opposite to the second limiting piece; the limiting bump is disposed at the outside of the housing and corresponds to an outer surface of the second sidewall.

9. The electrical connector according to claim 8, wherein the limiting bump comprises a limiting end part and a guiding end part; the guiding end part is closer than the limiting end part to the first sidewall; the limiting end part is parallel to the third direction; the guiding end part is inclined to the third direction; the minimum distance between one end of the guiding end part away from the limiting end part and the second limiting piece is greater than the minimum distance between one end of the guiding end part close to the limiting end part and the second limiting piece.

10. The electrical connector according to claim 9, wherein the minimum distance between the limiting end part and the second limiting piece is greater than or equal to the thickness of the second sidewall.

11. The electrical connector according to claim 4, wherein the limiting member comprises a limiting bump; the limiting bump is disposed at one side of the surface of the connecting housing close to the corresponding third sidewall and protrudes toward the corresponding third sidewall along the second direction.

12. The electrical connector according to claim 11, wherein the limiting bump comprises a limiting end part and a guiding end part; the guiding end part is closer than the limiting end part to the first sidewall; the limiting end part is parallel to the third direction; the guiding end part is inclined to the third direction; the minimum distance between one end of the guiding end away from the limiting end part and a side edge of the connecting housing close to the third sidewall is greater than the minimum distance between one end of the guiding end part close to the limiting end part and a side edge of the connecting housing close to the third sidewall.

13. The electrical connector according to claim 12, wherein the minimum distance between the limiting end part and a side edge of the connecting housing close to the third sidewall is greater than or equal to the thickness of the second sidewall.

14. The electrical connector according to claim 1, wherein the connector main body comprises an insulating body; two opposite sides of the insulating body are respectively provided with a first positioning part; two opposite sides of the connecting housing are respectively provided with a second positioning part; each of the second positioning parts is connected with the corresponding first positioning part.

15. The electrical connector according to claim 14 further comprising a bottom plate, the bottom plate being disposed at one side of the insulating body away from the housing and being connected with the housing.

16. The electrical connector according to claim 15, wherein a positioning column is disposed on a surface of the insulating body away from the housing; a positioning hole is disposed on the bottom plate, the positioning column passes through the positioning hole.

17. The electrical connector according to claim 15, wherein a securing column is disposed on a surface of the insulating body away from the housing; the bottom plate is provided with an inner recess and a securing hole; the securing hole is disposed in the inner recess; the securing column passes through the securing hole; one end of the securing column is hot-melted to cover the inner recess around the securing hole.

18. The electrical connector according to claim 1 further comprising a heat dissipating component and a securing elastic piece, the heat dissipating component comprising a plurality of radiators disposed at one side of the housing at intervals, the securing elastic piece being disposed at one side of the heat dissipating component and being connected with the housing.

19. The electrical connector according to claim 2 further comprising a light guiding tube comprising a light entering end, a light exiting end, a first light guiding end part, and a second light guiding end part, the light entering end being disposed at one side of the connecting housing away from the housing, the light exiting end being disposed at one side of the housing, the first light guiding end part extending along a third direction, the second light guiding end part extending along a first direction, the light entering end being disposed at one end of the first light guiding end part away from the second light guiding end part, the light exiting end being disposed at one end of the second light guiding end part away from the first light guiding end part, the first light guiding end part being disposed at one side of the connecting housing away from the housing, the second light guiding end part being disposed at one side of the housing.

20. The electrical connector according to claim 19, wherein the light guiding tube further comprises a first positioning column and a second positioning column; the first positioning column is disposed at the first light guiding end part and extends toward the light exiting end along the first direction; the second positioning column is disposed at the second light guiding end part and extends toward the light entering end along the third direction; a first positioning tab is disposed on an outer surface of the connecting housing in the third direction; a second positioning tab is disposed on the outer surface of the connecting housing; the first positioning column is connected with the first positioning tab; the second positioning column is connected with the second positioning tab.

\* \* \* \* \*